US006083620A

United States Patent [19]

LaPrade et al.

[11] Patent Number: 6,083,620

[45] Date of Patent: Jul. 4, 2000

[54] HEAT-TRANSFER LABEL INCLUDING A PHENOXY ADHESIVE LAYER

[75] Inventors: Jean Paul LaPrade, North Smithfield, R.I.; James S. Nugent, Hudson; Friedrich H. H. Geurtsen, Holliston, both of Mass.; Darchun Billy Yang, San Dimas, Calif.

[73] Assignee: Avery Dennison Corporation, Pasadena, Calif.

[21] Appl. No.: 09/189,277

[22] Filed: Nov. 10, 1998

[51] Int. Cl.[7] ................................ B32B 7/06; B32B 7/12; B44C 1/16

[52] U.S. Cl. ..................... 428/355 R; 428/349; 428/354; 428/914; 156/240; 156/239

[58] Field of Search ..................................... 428/343, 347, 428/349, 354, 355 R, 355 AC, 914; 156/240, 239

[56] References Cited

U.S. PATENT DOCUMENTS

| | | | |
|---|---|---|---|
| 4,548,857 | 10/1985 | Galante | 428/200 |
| 4,927,709 | 5/1990 | Parker et al. | 428/352 |
| 4,935,300 | 6/1990 | Parker et al. | 428/352 |
| 5,049,608 | 9/1991 | Medina | 524/375 |
| 5,800,656 | 9/1998 | Geurtsen et al. | 156/239 |
| 5,824,176 | 10/1998 | Stein et al. | 156/239 |

FOREIGN PATENT DOCUMENTS

WO 98/00294 1/1998 WIPO .

OTHER PUBLICATIONS

Technical literature for UCAR Phenoxy Resin PKHH, Union Carbide Corp., Hackensack, NJ, publicly available before the filing of the present application.

Technical literature for CYMEL 370, Cytec Industries, Inc., West Paterson, NJ, publicly available before the filing of present appln.

Technical literature for PAPHEN PKHW–34, InChem, Corp., South Carolina publicly available before the filing of the present application.

*Primary Examiner*—Daniel Zirker
*Attorney, Agent, or Firm*—Kriegsman & Kriegsman

[57] ABSTRACT

A heat-transfer label well-suited for use in decorating silane-treated glass articles. In a preferred embodiment, the label exhibits good scuff resistance, is capable of withstanding pasteurization conditions on a silane-treated glass article and includes (a) a support portion in the form of a sheet of paper overcoated with a release layer of polyethylene, (b) a skim coat of wax overcoated onto the polyethylene release layer and (c) a transfer portion, the transfer portion including a cross-linked phenoxy protective lacquer layer printed onto the skim coat, a polyester ink layer printed onto the protective lacquer layer, and an adhesive layer printed onto the ink layer, as well as onto any exposed portions of the underlying protective lacquer layer and onto a surrounding area of the skim coat. The cross-linked phenoxy resin comprises a solvent-soluble phenoxy resin of the formula

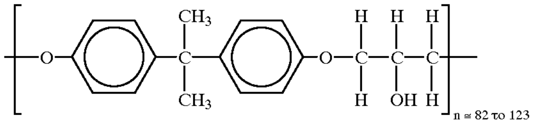

wherein the solvent-soluble phenoxy resin is cross-linked by a melamine formaldehyde resin. The adhesive layer comprises a phenoxy resin of the type present in a water-based phenoxy resin dispersion. The adhesive layer is preferably made by gravure printing onto its underlying layers an adhesive composition comprising the water-based phenoxy resin dispersion, isopropyl alcohol and water, and then evaporating the volatile components of the composition to leave an adhesive phenoxy film.

35 Claims, 1 Drawing Sheet

HEAT-TRANSFER LABEL INCLUDING A PHENOXY ADHESIVE LAYER

BACKGROUND OF THE INVENTION

The present invention relates generally to heat-transfer labels and more particularly to a heat-transfer label including a phenoxy adhesive layer.

Heat-transfer labels are commonly used in the decorating and/or labelling of commercial articles, such as, and without limitation to, containers for beverages (including alcoholic beverages, such as beer), essential oils, detergents, adverse chemicals, as well as health and beauty aids. As can readily be appreciated, heat-transfer labels are desirably resistant to abrasion and chemical effects in order to avoid a loss of label information and desirably possess good adhesion to the articles to which they are affixed.

One of the earliest types of heat-transfer label is described in U.S. Pat. No. 3,616,015, inventor Kingston, which issued October, 1971, and which is incorporated herein by reference. In the aforementioned patent, there is disclosed a heat-transfer label comprising a paper sheet or web, a wax release layer affixed to the paper sheet, and an ink design layer printed on the wax release layer. In the heat-transfer labelling process, the label-carrying web is subjected to heat, and the label is pressed onto an article with the ink design layer making direct contact with the article. As the paper sheet is subjected to heat, the wax layer begins to melt so that the paper sheet can be released from the ink design layer, a portion of the wax layer being transferred with the ink design layer and a portion of the wax layer remaining with the paper sheet. After transfer of the design to the article, the paper sheet is immediately removed, leaving the design firmly affixed to the article and the wax transferred therewith exposed to the environment. The wax layer is thus intended to serve two purposes: (1) to provide release of the ink design from the web upon application of heat to the web and (2) to form a protective layer over the transferred ink design. After transfer of the label to the article, the transferred wax release layer is typically subjected to a post-flaming technique which enhances the optical clarity of the wax protective layer (thereby enabling the ink design layer therebeneath to be better observed) and which enhances the protective properties of the transferred wax release.

Many heat-transfer labels include, in addition to the layers described above, an adhesive layer (comprising, for example, a polyamide or polyester adhesive) deposited over the ink design to facilitate adhesion of the label onto a receiving article. An example of a heat-transfer label having an adhesive layer is disclosed in U.S. Pat. No. 4,548,857, inventor Galante, which issued Oct. 22, 1985, and which is incorporated herein by reference. Additionally, many heat-transfer labels additionally include a protective lacquer layer interposed between the wax release layer and the ink layer. An example of such a label is disclosed in U.S. Pat. No. 4,426,422, inventor Daniels, which issued Jan. 17, 1984, and which is incorporated herein by reference.

One phenomenon that has been noted with heat-transfer labels of the type described above containing a wax release layer is that, quite often, a degree of hazing or a "halo" is noticeable over the transferred label when the transfer is made onto clear materials. This "halo" effect, which persists despite post-flaming and which may detract from the appearance of the label, is caused by the wax coating around the outer borders of the transferred ink design layer. Hazing due to the wax release layer may also appear in "open-copy" areas of the label, i.e., areas of the label where no ink is present between the adhesive and protective lacquer layers, and also may detract from the appearance of the label.

In addition to and related to the aforementioned problem of hazing, when heat-transfer labels of the type described above are applied to dark-colored containers, the outer wax layer of the label often appears as a whitish coating on the container, which effect is undesirable in many instances. Furthermore, scratches and similar abrasions to the outer wax layer of the label can occur easily and are readily detectable.

Accordingly, to address the aforementioned issues, considerable effort has been expended in replacing or obviating the need for a wax release layer. One such wax-less, heat-transfer label is disclosed in U.S. Pat. No. 3,922,435, inventor Asnes, which issued Nov. 25, 1975, and which is incorporated herein by reference. In the aforementioned patent, the layer of wax is replaced with a layer of a non-wax resin. This non-wax resinous layer is referred to in the patent as a dry release since it does not transfer to the article along with the ink design layer. In a preferred embodiment of the patent, the non-wax resinous layer comprises a thermoset polymeric resin, such as cross-linked resins selected from the group consisting of acrylic resins, polyamide resins, polyester resins, vinyl resins and epoxy resins.

Another example of a wax-less, heat-transfer label is disclosed in U.S. Pat. No. 4,935,300, inventors Parker et al., which issued Jun. 19, 1990, and which is incorporated herein by reference. In the aforementioned patent, the label, which is said to be particularly well-suited for use on high density polyethylene, polypropylene, polystyrene, polyvinylchloride and polyethylene terephthalate surfaces or containers, comprises a paper carrier web which is overcoated with a layer of polyethylene. A protective lacquer layer comprising a polyester resin and a relatively small amount of a non-drying oil is printed onto the polyethylene layer. An ink design layer comprising a resinous binder base selected from the group consisting of polyvinylchloride, acrylics, polyamides and nitrocellulose is then printed onto the protective lacquer layer. A heat-activatable adhesive layer comprising a thermoplastic polyamide adhesive is then printed onto the ink design layer.

Although the above-described wax-less, heat-transfer label substantially reduces the wax-related effects discussed previously, said label does not quite possess the same release characteristics of heat-transfer labels containing a wax release layer. Accordingly, another type of heat-transfer label differs from the heat-transfer label disclosed in U.S. Pat. No. 4,935,300, only in that a very thin layer or "skim coat" of a waxlike material is interposed between the polyethylene release layer and the protective lacquer layer to improve the release of the protective lacquer from the polyethylene-coated carrier web. The thickness of the skim coat corresponds to approximately 0.1–0.4 lbs. of the wax-like material spread onto about 3000 square feet of the polyethylene release layer.

An example of the aforementioned type of heat-transfer label, which has been sold by the assignee of the present application for use in labelling polypropylene bottle caps, comprises a paper carrier web overcoated with a layer of polyethylene. A skim coat is overcoated on the polyethylene layer. A protective lacquer layer comprising vinyl and polyester resins is printed onto the skim coat. An ink design layer comprising vinyl and polyester resins is printed onto the protective lacquer layer. A heat-activatable adhesive layer comprising an acrylic resin, a solvent-soluble chlorinated polypropylene and a plasticizer is printed over the ink design and protective lacquer layers. The acrylic resin is a butyl methacrylate resin, such as ELVACITE® 2045, which is commercially available from ICI Acrylics Inc. (Wilmington, Del.). The solvent-soluble chlorinated polypropylene is commercially available from Eastman Chemical Products, Inc. (Kingsport, Tenn.) as chlorinated polyolefin CP-343-1. The plasticizer is a glyceryl tribenzoate, such as BENZOFLEX® S-404, which is commercially available from Velsicol Chemical Corporation (Chicago, Ill.).

In U.S. Pat. No. 5,824,176, inventors Stein et al., which issued Oct. 20, 1998, and which is herein incorporated by reference, there is disclosed a composition for use in forming an adhesive layer and a heat-transfer label including such an adhesive layer. In one embodiment, the label is designed for use on silane-treated glass containers of the type that are subjected to pasteurization conditions. The label includes a support portion and a transfer portion, the transfer portion being positioned over the support portion. The support portion includes a sheet of paper overcoated with a release layer of polyethylene. The transfer portion includes an organic solvent-soluble phenoxy protective lacquer layer, an organic solvent-soluble polyester ink layer over the protective lacquer layer, and an acrylic adhesive layer over the ink layer. The adhesive layer is formed by depositing onto the ink layer, e.g., by gravure printing, a composition comprising a water-based acrylic resin dispersion or emulsion, isopropyl alcohol and water, and then evaporating the volatile components of the composition to leave an acrylic film.

In U.S. Pat. No. 5,800,656, inventors Geurtsen et al., which issued Sep. 1, 1998, and which is incorporated herein by reference, there is disclosed a heat-transfer label including a phenoxy lacquer layer. In one embodiment, the label is designed for use on silane-treated glass containers of the type that are subjected to pasteurization conditions. The label includes a support portion and a transfer portion, the transfer portion being positioned over the support portion. The support portion includes a sheet of paper overcoated with a release layer of polyethylene. The transfer portion includes an organic solvent-soluble phenoxy resin protective lacquer layer, an organic solvent-soluble polyester resin ink layer over the protective lacquer layer, and a water-dispersible acrylic adhesive resin layer over the ink layer.

In commonly-assigned, presently-pending U.S. patent application Ser. No. 09/093,150, which application is incorporated herein by reference, there is disclosed a heat-transfer label suitable for use in decorating glass articles. According to one embodiment, the label is capable of withstanding pasteurization conditions and includes (a) a support portion in the form of a sheet of paper overcoated with a release layer of polyethylene, (b) a skim coat of wax overcoated onto the polyethylene release layer and (c) a transfer portion, the transfer portion including a cross-linked phenoxy protective lacquer layer printed onto the skim coat, a polyester ink layer printed onto the protective lacquer layer, and a first adhesive layer printed onto the ink layer and onto any exposed portions of the underlying protective lacquer layer. The aforementioned cross-linked phenoxy resin comprises a solvent-soluble phenoxy resin of the formula

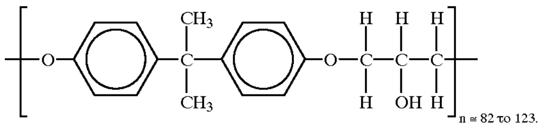

wherein said solvent-soluble phenoxy resin is cross-linked by a partially methylated melamine formaldehyde resin. The above-mentioned first adhesive layer comprises an acrylic adhesive resin of the type present in a water-based adhesive dispersion or in a water-based adhesive emulsion (e.g., RHOPLEX® GL-618 emulsion) and also comprises an alcohol, a pH adjustment agent for bring the pH of the adhesive composition to about 9–10 and a surfactant in the form of dioctyl sodium sulfosuccinate (e.g., Triton GR-5M).

The aforementioned label has been used to decorate silane-treated glass containers and, by and large, has proven to be generally satisfactory in terms of scuff resistance and ability to withstand pasteurization conditions (for example, where the glass containers are used to hold beer that is pasteurized in the glass containers). Nevertheless, the present inventors have noted that, when used to label thick-walled, silane-treated glass containers, such as wine bottles or other heavy glass bottles, the subject label often has a tendency to become scuffed or damaged by bottle-to-bottle or bottle-to-machinery contact during filling, packaging and/or shipping operations. Accordingly, there exists a need for a label that is well-suited for use on silane-treated glass containers, that exhibits improved scuff resistance and that can withstand pasteurization conditions.

Other patents and publications of interest relating to the use of heat-transfer labels include U.S. Pat. No. 4,927,709, inventors Parker et al., which issued May 22, 1990; and PCT Application No. PCT/US97/11309, published Jan. 8, 1998, both of which are incorporated herein by reference.

SUMMARY OF THE INVENTION

It is an object of the present invention to provide a new heat-transfer label.

It is another object of the present invention to provide a heat-transfer label that overcomes at least some of the problems discussed above in connection with existing heat-transfer labels.

According to one aspect of the present invention, there is provided a heat-transfer label, said heat-transfer label comprising (a) a support portion; and (b) a transfer portion over said support portion for transfer of the transfer portion from the support portion to an article upon application of heat to the support portion while the transfer portion is placed into contact with the article, said transfer portion comprising (i) a protective lacquer layer; (ii) an ink layer over said protective lacquer layer; and (iii) an adhesive layer over said ink and protective lacquer layers, said adhesive layer comprising a phenoxy resin.

In a preferred embodiment, said phenoxy resin of said adhesive layer is a phenoxy resin of the type present in a water-based phenoxy resin dispersion (e.g., PAPHEN® PKHW-34, InChem Corp.), and said adhesive layer is preferably made by gravure printing onto its underlying layers a composition comprising said water-based phenoxy resin dispersion, isopropyl alcohol and water, and then evaporating the volatile components of the composition to leave a phenoxy film. In addition, said ink layer preferably comprises a polyester ink and/or a phenoxy ink, and said protective lacquer layer preferably comprises a cross-linked phenoxy resin, said cross-linked phenoxy resin preferably being made by cross-linking a solvent-soluble phenoxy resin of the following chemical formula:

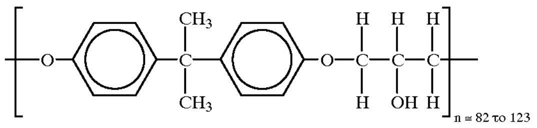

with a melamine formaldehyde resin. The aforementioned heat-transfer label preferably further comprises a waxlike skim coat, said waxlike skim coat being interposed between said support portion and said transfer portion, wherein said transfer portion preferably comprises polyethylene-coated paper.

The aforementioned label is particularly well-suited for use in decorating silane-treated glass containers, especially silane-treated glass containers subjected to pasteurization conditions; however, it is to be understood that said label is not limited in its use to decorating silane-treated glass containers and may be used to decorate other types of containers including, but not limited to, aluminum cans, plastic containers and the like. (For purposes of the present specification and claims, the term "silane-treated glass containers" is intended to encompass glass containers that have been pre-treated, prior to silane-treatment, with oleic acid or stearate (regardless of whether said pre-treatment is thereafter removed prior to silane-treatment) and those that have not been pre-treated prior to silane-treatment.) The subject heat-transfer label, when used to decorate silane-treated glass containers, has exhibited improved scuff resistance as compared to the above-described heat-transfer label comprising a cross-linked phenoxy protective lacquer layer, a polyester ink and an adhesive layer comprising an acrylic resin of the type present in a water-based acrylic resin dispersion or emulsion. Moreover, said heat-transfer label, when used to decorate silane-treated glass containers, has exhibited an ability to withstand being subjected to pasteurization conditions for a longer period of time than has the aforementioned label comprising an acrylic adhesive.

In addition to being directed to the above-described heat-transfer label, the present invention is also directed to a transfer portion of a heat-transfer label comprising a phenoxy adhesive layer, to methods of making said heat-transfer label and said transfer portion, and to a composition used to form said phenoxy adhesive layer of said heat-transfer label and said transfer portion. Moreover, the present invention is also directed to a method of decorating an article, such as a silane-treated glass container, using said heat-transfer label.

For purposes of the present specification and claims, it is to be understood that certain terms used herein, such as "on" or "over," when used to denote the relative positions of two or more layers of a heat-transfer label, are primarily used to denote such relative positions in the context of how those layers are situated prior to transfer of the transfer portion of the label to an article since, after transfer, the arrangement of layers is inverted as those layers which were furthest removed from the associated support sheet are now closest to the labelled article.

Additional objects, as well as features, advantages and aspects of the present invention, will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts.

DETAILED DESCRIPTION OF PREFERRED EMBODIMENTS

Figure 1:
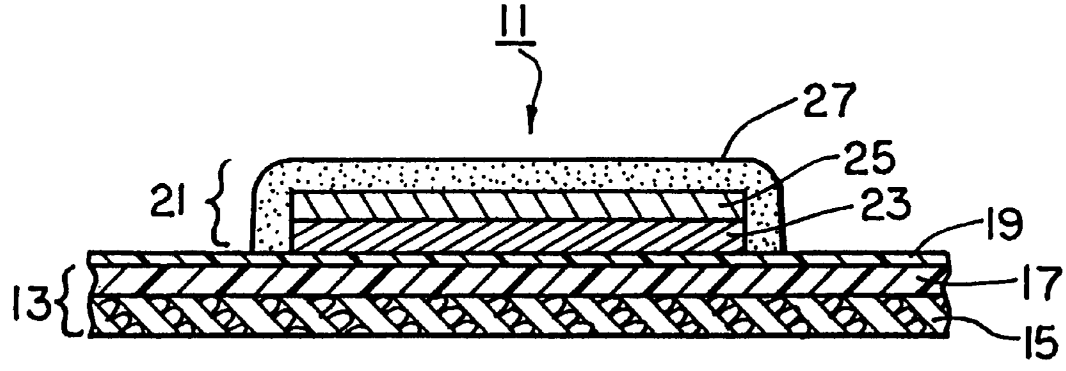
FIG. 1 is a schematic section view of a heat-transfer label that is particularly well-suited for, but not limited to, use in decorating silane-treated glass containers of the type that are thereafter subjected to pasteurization conditions, the heat-transfer label being constructed according to the teachings of the present invention.

Referring now to FIG. 1, there is shown a schematic section view of a heat-transfer label that is particularly well-suited for use in, but is not limited to, decorating silane-treated glass containers of the type that are, after decoration and filling, subjected to pasteurization conditions, the heat-transfer label being constructed according to the teachings of the present invention and being represented generally by reference numeral 11.

Label 11 comprises a support portion 13. Support portion 13, in turn, comprises a carrier web 15 overcoated with a layer 17 preferably of polyethylene. Carrier web 15 is typically made of paper or a similarly suitable substrate. Details of polyethylene layer 17 are disclosed in U.S. Pat. Nos. 4,935,300 and 4,927,709, the disclosures of which, as noted above, are incorporated herein by reference.

Label 11 also comprises a skim coat 19 of the type described above, said skim coat being coated directly on top of the entirety of polyethylene layer 17. During label transfer, a portion of skim coat 19 is typically transferred along with the transfer portion of label 11 onto the article being decorated, and a portion of skim coat 19 remains on top of polyethylene layer 17.

Label 11 further comprises a transfer portion 21. Transfer portion 21, in turn, includes (i) a protective lacquer layer 23 printed directly on top of a portion of skim coat 19, (ii) an ink design layer 25 printed onto a desired area of lacquer layer 23, and (iii) a heat-activatable adhesive layer 27 printed onto design layer 25, any exposed portions of lacquer layer 23 and a surrounding portion of skim coat 19.

Protective lacquer layer 23 preferably comprises a cross-linked phenoxy lacquer resin; however, it is to be understood that other types of lacquer resins may also be suitable for use in layer 23, especially if label 11 is being used for applications other than decorating silane-treated glass articles subjected to pasteurization conditions. Examples of phenoxy lacquer resins suitable for use in the aforementioned cross-linked phenoxy resin include the UCAR® Phenoxy Resins (Union Carbide Corporation, Hackensack, N.J.), which have the following chemical tructure:

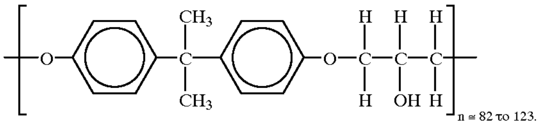

A particularly preferred UCAR® Phenoxy Resin is PKHH, a medium weight grade of the above structure which, at 40% solids, by weight, in methyl ethyl ketone (MEK), has a solution viscosity of 4500 to 7000 mPa•s(cP). Examples of a suitable cross-linker for cross-linking the aforementioned phenoxy resin include partially methylated melamine-formaldehyde resins of the type present in the CYMEL 300 series of partially methylated melamine-formaldehyde resin solutions (Cytec, Industries, Inc., West Paterson, N.J.) and, in particular, CYMEL 370 partially methylated melamine-formaldehyde resin solution (88±2% nonvolatiles, iBuOH solvent). Preferably, the solids of the aforementioned CYMEL 370 resin solution constitute no more than about 5%, by weight, of lacquer layer 23 (with the remainder of lacquer layer 23 being the aforementioned phenoxy resin) since the present inventors have discovered that amounts of CYMEL 370 in excess thereof tend to cause lacquer layer 23 to adhere undesirably to support portion 13 during label transfer.

One advantage to using a cross-linker of the aforementioned melamine-formaldehyde type, as opposed to other types of cross-linkers, is that said cross-linker does not require the use of a catalyst, but rather, is heat-activatable and that the heat-activation thereof can be achieved during the routine "post-curing" step (i.e., a heating of the decorated container at about 420° F. for about 20 minutes) to which the decorated container would ordinarily be subjected anyway following label transfer. It should be noted, however, that the present invention is not limited to such heat-activatable cross-linkers.

To form lacquer layer 23, a lacquer composition comprising the above-identified phenoxy lacquer resin, a suitable cross-linker and one or more suitable volatile solvents are deposited onto a desired area of skim coat 19, preferably by gravure printing or a similar technique. After deposition of the lacquer composition onto the desired area of skim coat 19, the volatile solvent(s) evaporate(s), leaving only the non-volatile components thereof to make up lacquer layer 23. In a preferred embodiment, the lacquer composition comprises about 20%, by weight, PKHH; about 1%, by weight, CYMEL 370 resin solution; about 59%, by weight, methyl ethyl ketone; and about 20%, by weight, toluene.

Ink design layer 25 of transfer portion 21 preferably comprises a polyester ink and/or a phenoxy ink. Other types of ink may also be suitable, depending upon the composition of layer 23 and depending upon whether the label is to be used for applications other than for silane-treated glass articles subjected to pasteurization conditions. Ink design layer 25 is formed in the conventional manner by depositing, by gravure printing or the like, an ink composition comprising a resin of the type described above, a suitable pigment or dye and one or more suitable volatile solvents (typically nonpolar organic solvents) onto one or more desired areas of lacquer layer 23. After application of the ink composition onto lacquer layer 23, the volatile solvent component(s) of the ink solvent system evaporate(s), leaving only the non-volatile ink components to form layer 25.

An example of a suitable resin for use in forming a polyester ink is ViTEL® 2700 (Shell Chemical Company, Akron, Ohio)—a copolyester resin having a high tensile strength (7000 psi) and a low elongation (4% elongation). A ViTEL® 2700-based polyester ink composition may comprise, by weight, 18% ViTEL® 2700, 6% pigment, 30.4% n-propyl acetate (NP Ac) and 45.6% toluene. As can readily be appreciated, ViTEL® 2700 is, by no means, the only polyester resin that may be used to formulate a polyester ink, and solvent systems, other than an NP Ac:toluene system, may be suitable for use with ViTEL® 2700, as well as with other polyester resins.

Adhesive layer 27 of transfer portion 21 comprises a phenoxy adhesive resin of the type present in a water-based phenoxy dispersion. Adhesive layer 27 is preferably formed by depositing, by gravure printing or the like, onto ink layer 25, exposed portions of lacquer layer 23 and a surrounding area of skim coat 19 an adhesive composition preferably comprising a water-based phenoxy dispersion, an alcohol and water. (The adhesive composition may also include a crosslinker although the inclusion of such a crosslinker is not essential, particularly where protective lacquer layer 23 includes a crosslinker.) After deposition of the adhesive composition onto the underlying layers of label 11, the volatile components of the composition (e.g., water, alcohol) evaporate, leaving only the non-volatile solid components thereof to form layer 27.

A preferred example of the water-based phenoxy dispersion is PAPHEN® PKHW-34 (InChem Corp., South Carolina), an anionically-stabilized aqueous colloidal dispersion of a solid grade phenoxy resin, said dispersion having a solids content of about 34%, by weight, a pH of about 7.2, a Brookfield viscosity at 25° C. of about 1100 cP, a weight per gallon of about 8.80 pounds, an average particle size of about 0.09 micron, a flash point (PMCC) of about 141° F. and a freeze point of about −4° C. PAPHEN® PKHW-34 provides both hydroxyl groups and carboxyl groups for subsequent cross-linking at elevated temperatures.

In a preferred embodiment, the adhesive composition comprises about 66.5%, by weight, of PAPHEN® PKHW dispersion; about 16.75%, by weight, of isopropyl alcohol; and about 16.75%, by weight, water. Preferably, the water-borne phenoxy dispersion is stirred slowly while the combination of isopropyl alcohol and water are added thereto. A trace amount of a UV dye may be also be included in the composition to facilitate registration of the layer during printing.

Label 11 may be used in the conventional manner by contacting adhesive layer 27 to a desired article, such as a silane-treated glass container, while applying sufficient heat to the bottom of carrier web 15 so as to cause transfer portion 21 (and, likely, a portion of skim coat 19) to be released from support portion 13 and so as to cause adhesive layer 27 to become heat-activated for bonding to the desired article. Post-curing and any other conventional processing steps would be performed in the usual manner.

The present inventors have noted that, when label 11 is used to decorate silane-treated glass containers, a good degree of label adherence is achieved (i.e., about a 4–6 H, as measured by ASTM standard D3363-92a for film hardness on a substrate). Moreover, the above-mentioned problem of open-copy hazing, often encountered when labelled containers are subjected to pasteurization conditions (even for extended periods, such as 1 hour), is substantially absent in the present case. Furthermore, the present inventors have noted that the present label possesses a high degree of chemical, abrasion and scuff resistance.

Figure 2:
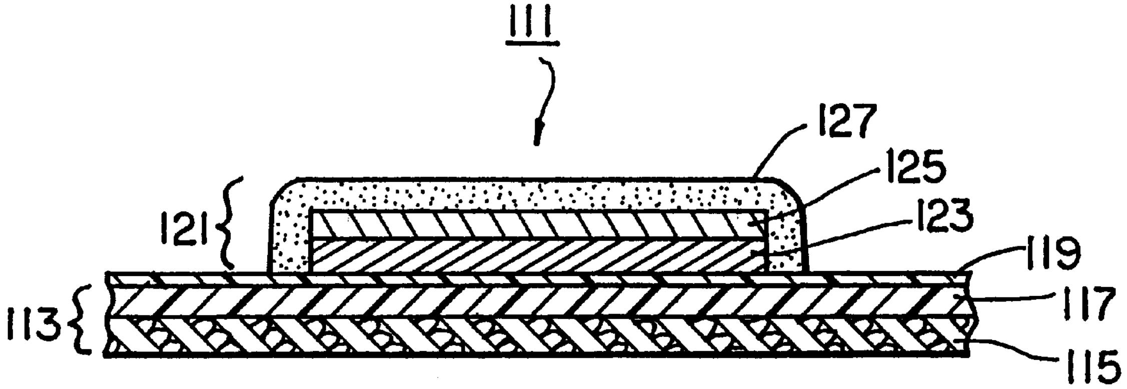
FIG. 2 is a schematic section view of a heat-transfer label that is particularly well-suited for, but not limited to, use in decorating silane-treated glass containers of the type that are not thereafter subjected to pasteurization conditions, the heat-transfer label being constructed according to the teachings of the present invention.

Referring now to FIG. 2, there is shown a schematic section view of a heat-transfer label that is particularly well-suited for use in, but not limited to, decorating silane-treated glass containers of the type that are not subjected to pasteurization conditions, the heat-transfer label being constructed according to the teachings of the present invention and being represented generally by reference numeral 111.

Label 111 is similar in many respects to label 11, label 111 including a support portion 113 comprising a carrier web 115 overcoated with a polyeth ylene layer 117 and a skim coat 119 coated directly on top of the entirety of polyethylene layer 17. In addition, label 111 includes a transfer portion 121, transfer portion 121 including a protective lacquer layer 123 printed directly on top of a portion of skim coat 119, (ii) an ink design layer 125 printed onto a desired area of lacquer layer 123, and (iii) a heat-activatable adhesive layer 127 printed onto design layer 125, any exposed portions of lacquer layer 123 and a surrounding portion of skim coat 119. Protective lacquer layer 123 and ink design layer 125 of label 111 are identical to lacquer layer 23 and ink design layer 25, respectively, of label 11. Label 111 differs from label 11 only in that adhesive layer 127 of label 111 is identical in composition to cross-linked phenoxy lacquer layer 123.

Label 111 is used in the same manner as label 11, except that label 111 is not as well-suited as label 11 for articles that are subjected to pasteurization conditions. (In other words, label 111 may become more hazy when subjected to pasteurization conditions than will label 11; nevertheless, label 111 still should adhere well and exhibit good abrasion and scuff resistance.)

According to another embodiment of the present invention (not shown), label 11 is modified so that protective lacquer layer 23 is replaced with a layer identical in composition to adhesive layer 27.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A heat-transfer label comprising:

(a) a support portion; and (b) a transfer portion over said support portion for transfer of the transfer portion from the support portion to an article upon application of heat to the support portion while the transfer portion is placed into contact with the article, said transfer portion comprising (i) a protective lacquer layer;

(ii) an ink layer over said protective lacquer layer; and (iii) an adhesive layer over said ink and protective lacquer layers, said adhesive layer comprising a phenoxy resin.

2. The heat-transfer label as claimed in claim 1 further comprising a waxlike skim coat, said waxlike skim coat being interposed between said support portion and said transfer portion.

3. The heat-transfer label as claimed in claim 1 wherein said phenoxy resin is a phenoxy resin of the type present in a waterborne phenoxy dispersion.

4. The heat-transfer label as claimed in claim 3 wherein said waterborne phenoxy dispersion is an anionically-stabilized aqueous colloidal dispersion of a solid grade phenoxy resin having both hydroxyl groups and carboxyl groups, said anionically-stabilized aqueous colloidal dispersion having a solids content of about 34%, by weight, a pH of about 7.2, a Brookfield viscosity at 25° C. of about 1100 cP, a weight per gallon of about 8.80 pounds, an average particle size of about 0.09 micron, a flash point (PMCC) of about 141° F. and a freeze point of about −4° C.

5. The heat-transfer label as claimed in claim 4 wherein said adhesive layer is made by depositing onto said ink and protective lacquer layers a composition comprising about 66.5%, by weight, of said anionically-stabilized aqueous colloidal dispersion, about 16.75%, by weight, isopropyl alcohol and about 16.75%, by weight, water and then evaporating the volatile components thereof.

6. The heat-transfer label as claimed in claim 1 wherein said ink layer comprises at least one of a polyester ink and a phenoxy ink.

7. The heat-transfer label as claimed in claim 1 wherein said protective lacquer layer comprises a cross-linked phenoxy resin.

8. The heat-transfer label as claimed in claim 6 wherein said protective lacquer layer comprises a solvent-soluble phenoxy resin.

9. The heat-transfer label as claimed in claim 3 wherein said protective lacquer layer comprises a cross-linked phenoxy resin and wherein said ink layer comprises at least one of a polyester ink and a phenoxy ink.

10. The heat-transfer label as claimed in claim 9 wherein said cross-linked phenoxy resin ismade by cross-linking a solvent-soluble phenoxy resin having the following chemical structure:

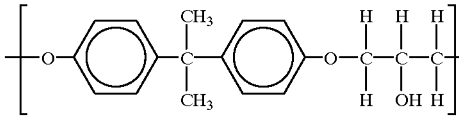

n = 82 to 123.

11. The heat-transfer label as claimed in claim 10 wherein said solvent-soluble phenoxy resin, prior to cross-linking, has a solution viscosity of 4500 to 7000 mPa•s(cP) at 40% solids, by weight, in methyl ethyl ketone.

12. The heat-transfer label as claimed in claim 11 wherein said solvent-soluble phenoxy resin is cross-linked using a melamine-formaldehyde resin.

13. The heat-transfer label as claimed in claim 12 wherein said melamine-formaldehyde resin is a partially methylated melamine-formaldehyde resin.

14. The heat-transfer label as claimed in claim 13 wherein said partially methylated melamine-formaldehyde resin constitutes no more than about 5%, by weight, of said protective lacquer layer.

15. The heat-transfer label as claimed in claim 1 wherein said phenoxy resin is a cross-linked phenoxy resin.

16. The heat-transfer label as claimed in claim 15 wherein said cross-linked phenoxy resin is made by cross-linking a solvent-soluble phenoxy resin having the following chemical structure:

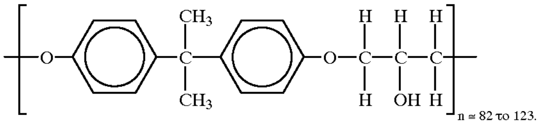

17. The heat-transfer label as claimed in claim 16 wherein said solvent-soluble phenoxy resin, prior to cross-linking, has a solution viscosity of 4500 to 7000 mPa•s(cP) at 40% solids, by weight, in methyl ethyl ketone.

18. The heat-transfer label as claimed in claim 17 wherein said solvent-soluble phenoxy resin is cross-linked using a melamine-formaldehyde resin.

19. The heat-transfer label as claimed in claim 18 wherein said melamine-formaldehyde resin is a partially methylated melamine-formaldehyde resin.

20. The heat-transfer label as claimed in claim 19 wherein said partially methylated melamine-formaldehyde resin constitutes no more than about 5%, by weight, of said adhesive layer.

21. The heat-transfer label as claimed in claim 1 wherein said phenoxy resin is a solvent-soluble phenoxy resin.

22. The heat-transfer label as claimed in claim 21 wherein said protective lacquer layer comprises a cross-linked phenoxy resin and wherein said ink layer comprises at least one of a polyester ink and a phenoxy ink.

23. A transfer portion of a heat-transfer label, said transfer portion comprising:

(a) an ink design layer; and (b) an adhesive layer positioned over said ink design layer, said adhesive layer comprising a phenoxy resin.

24. The transfer portion as claimed in claim 23 wherein said phenoxy resin is a phenoxy resin of the type present in a waterborne phenoxy dispersion.

25. The transfer portion as claimed in claim 24 wherein said waterborne phenoxy dispersion is an anionically-stabilized aqueous colloidal dispersion of a solid grade phenoxy resin having both hydroxyl groups and carboxyl groups, said anionically-stabilized aqueous colloidal dispersion having a solids content of about 34%, by weight, a pH of about 7.2, a Brookfield viscosity at 25° C. of about 1100 cP, a weight per gallon of about 8.80 pounds, an average particle size of about 0.09 micron, a flash point (PMCC) of about 141° F. and a freeze point of about −4° C.

26. The transfer portion as claimed in claim 24 wherein said ink design layer comprises at least one of a polyester ink and a phenoxy ink.

27. The transfer portion as claimed in claim 26 further comprising a protective lacquer layer, said protective lacquer layer comprising a cross-linked phenoxy resin, said ink design layer being positioned over said protective lacquer layer.

28. The transfer portion as claimed in claim 23 wherein said phenoxy resin is a cross-linked phenoxy resin.

29. The transfer portion as claimed in claim 28 wherein said cross-linked phenoxy resin is made by cross-linking a solvent-soluble phenoxy resin having the following chemical structure:

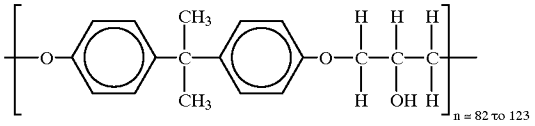

wherein said solvent-soluble phenoxy resin is cross-linked using a melamine-formaldehyde resin.

30. The transfer portion as claimed in claim 29 wherein said ink design layer comprises at least one of a polyester ink and a phenoxy ink.

31. The transfer portion as claimed in claim 30 further comprising a protective lacquer layer, said protective lacquer layer comprising a cross-linked phenoxy resin, said ink design layer being positioned over said protective lacquer layer.

32. A method of decorating an article, said method comprising the steps of:

(a) providing a heat-transfer label, said heat-transfer label comprising:

(i) a support portion, and (ii) a transfer portion over said support portion for transfer of the transfer portion from the support portion to the article upon application of heat to the support portion while the transfer portion is placed into contact with the article, said transfer portion comprising a protective lacquer layer, an ink design layer over said protective lacquer layer, and an adhesive layer over said ink and protective lacquer layers, said adhesive layer comprising a phenoxy resin; and (b) transferring said transfer portion from said support portion to the article.

33. The method as claimed in claim 32 wherein the article is a silane-treated glass container and wherein said phenoxy resin is a phenoxy resin of the type present in a waterborne phenoxy dispersion.

34. The method as claimed in claim 33 further comprising, after said transferring step, the step of subjecting the decorated silane-treated glass container to pasteurization conditions.

35. The method as claimed in claim 32 wherein said phenoxy resin is a cross-linked solvent-soluble phenoxy resin.

* * * * *